Aug. 4, 1936.   A. EMERSON, JR., ET AL   2,049,607
LAMP CONSTRUCTION
Filed Oct. 17, 1934
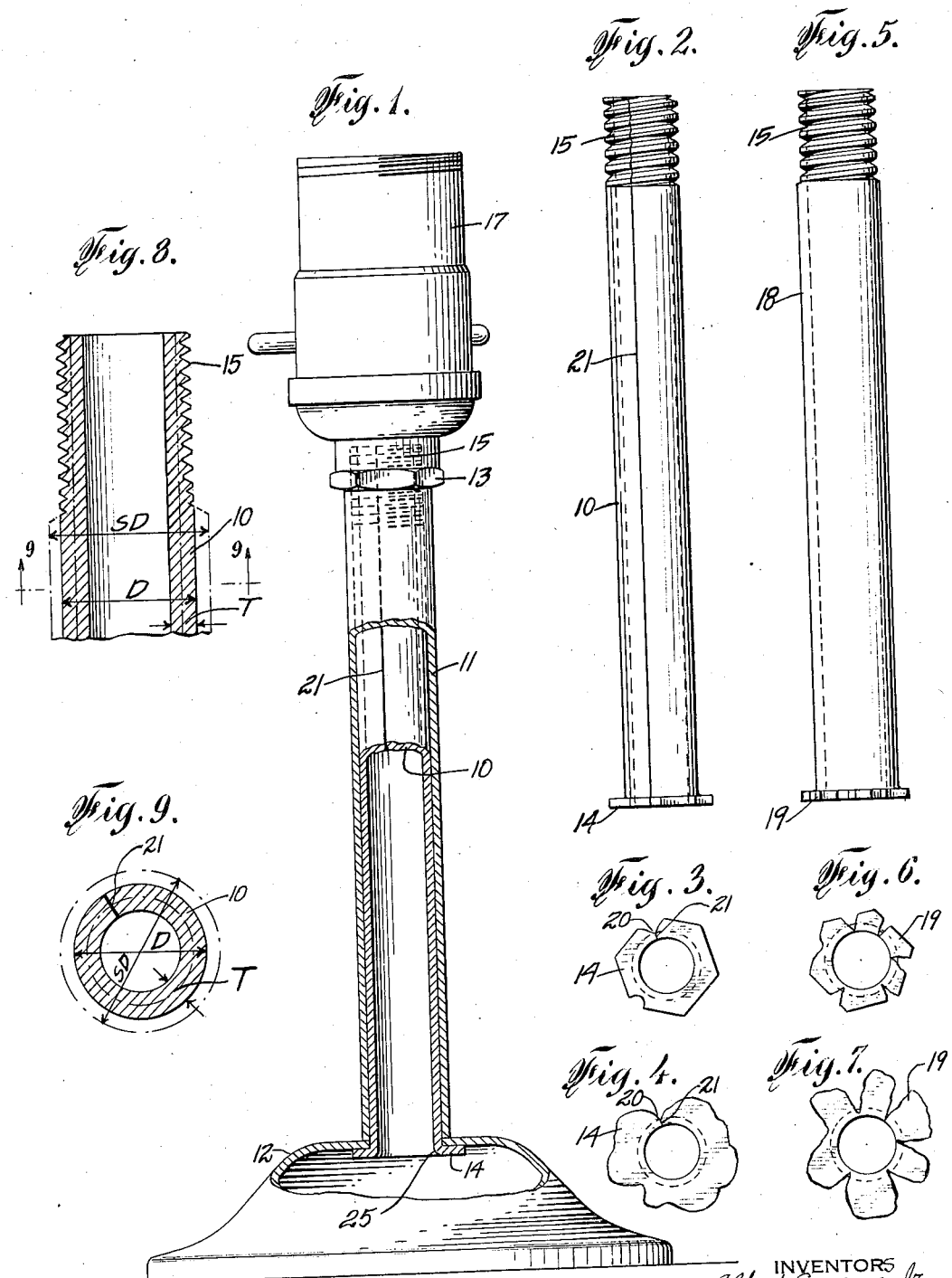
INVENTORS
Alfred Emerson Jr.
Stuart M. Strauss
BY Emanuel Scheyer
ATTORNEY Patented Aug. 4, 1936

2,049,607

UNITED STATES PATENT OFFICE 2,049,607

LAMP CONSTRUCTION

Alfred Emerson, Jr. and Stuart M. Strauss,
New York, N. Y.

Application October 17, 1934, Serial No. 748,601

5 Claims. (Cl. 248—158)

This invention relates to pipe or tubing, particularly steel tubing, and is in special reference to the use of such tubing in electric lamps as the supporting tubing therefor. The invention relates particularly to pipes of the smaller diameters.

It is an object of the present invention to produce a pipe, which does not require too much metal to be taken off in threading, this feature being of especial importance in the novel method of producing the pipe and its construction.

A novel feature of the invention is the formation of pipe from the skelp, in which the latter is bent into pipe form, but with the edges of the skelp brought into abutment without being welded or fused as is the standard practice in steel pipe of the smaller sizes. The standard practice for pipes less than one and a quarter inches in diameter, is to butt-weld them by drawing the skelp, while heated to welding temperature, through a die or bell. The inside of the welding bell is so shaped that the plate or skelp is gradually turned around into the shape of a tube, the edges being forced squarely together and welded. The term skelp is applied to the plate from which the pipe is bent, said plate being rolled to the necessary width and gage for the size pipe to be made. Since about 1862, the dimensions of small pipe have been of fixed standard dimensions. These dimensions have been broadly spread and are widely known as "Briggs' Standard." Likewise the threading of pipe for couplings has widely and long been standardized in the use of the American (Briggs') Standard Thread. Where the pipe is threaded for the use of nuts thereon, a standard thread, known as Electrical Thread, is used. Such a thread is used in the electrical trade in the manufacture of lamps. The latter thread is similar to the American (Briggs') Standard Thread, but is not tapered, except for the lead. To depart from these standard threads in fabricating pipe for general trade uses would be impractical and would result in prohibitive expense.

Applicants have found that to thread their unwelded pipe with threads of standard size for the pipe by means of a die, when said pipe is of standard dimensions is impractical as the die twists the end of the pipe out of shape and even causes fracture. This is due to the weakness inherent in the new pipe because of the split therein. Applicants therefore form their pipe of standard wall thickness or nearly so, but of substantially lesser outside diameter than standard, and on the pipe thus formed, produce a thread having a standard root diameter for a thread which is standard for a pipe of the standard outside diameter. In this way much less metal must be removed by the die. In more general words, standard thread is used on their split pipe, but said thread is standard for a pipe of larger diameter than said pipe.

In producing unwelded pipe, applicants have considerably cheapened the cost of manufacture over welded pipe, and for such uses, as the supporting tubing of a lamp, their pipe is satisfactory even if their pipe is weakened by the presence of a split.

It is a further object of their invention to produce a supporting tubing for a lamp in which one end is flanged and the other threaded and to embody same in a novel lamp construction. The flanged end is formed into polygonal shape, preferably hexagonal, to make it suitable for gripping by a wrench.

Other objects and advantages will become apparent upon a further study of the description and drawing, in which:—

Fig. 1 is an elevation of the lamp construction, partially in section, showing the split supporting tube flanged and threaded.

Fig. 2 is an elevation of the split supporting tube shown by itself.

Fig. 3 is a bottom view of the tube of Fig. 2, showing the flange cut into substantially hexagonal shape.

Fig. 4 is a bottom view of the tube of Fig. 2 showing the flange before being cut into substantially hexagonal shape.

Fig. 5 is an elevation of a welded supporting tube shown by itself.

Fig. 6 is a bottom view of the tube of Fig. 5, showing the flange cut into substantially hexagonal shape.

Fig. 7 is a bottom view of the tube of Fig. 5 showing the flange before being cut into substantially hexagonal shape.

Fig. 8 is a section to an enlarged scale of a portion of the upper end of the tube of Fig. 2 taken along the longitudinal axis thereof, shown superimposed upon a standard tube, the latter being in dot and dash lines, and—

Fig. 9 is a section taken along the line 9—9 of Fig. 8.

A supporting tube 10 has mounted over it a sleeve 11, extending at its lower end from the top of base 12 to the under side of nut 13 at its upper end. Tube 10 has a split 21 in it. Said tube, which is provided with a flange 14 at its lower end, projects through an opening provided in the top of base 12. The upper end of tube 10 is provided with threads 15. The upper end of tube 10 projects above the upper end of sleeve 11, said sleeve being finished plain at both ends. Nut 13 is screwed on threads 15 to bear hard down upon the top of sleeve 11, forcing the lower end of sleeve down against base 12 while flange 14 presses up. A lamp socket 17 is screwed upon threads 15 above nut 13.

In Fig. 1 a split tube 10 is shown in the lamp, but of course the welded tube 18, Fig. 5, could be used as well for the purposes of the lamp construction, except that said latter tube is considerably more expensive to produce. When welded tube 18 is used, as will be explained hereinafter, the inside diameter of sleeve 11 will preferably be larger, although the same size nut 13 can be used in either case.

Split tube 10 is produced by passing skelp or a plate of the required thickness and width for the given diameter through a die, which bends said skelp into tube form, bringing the edges of the skelp into abutment at the split 21. As the skelp is bent cold, the abutting edges are not welded or fused.

Because of difficulty in threading the end of a split tube with a die, the outside diameter D of tube 10, Figs. 8 and 9, is made substantially less than the outside diameter of a tube which would have the standard diameter SD corresponding to the wall thickness T or very nearly said thickness. Such a standard size tube is indicated in dot and dash lines in Figs. 8 and 9. But the threads 15 have a root diameter, that is the diameter at the base of the threads, which is standard for a thread to be used on a pipe, or bar having a diameter SD. As noted before, a pipe or tube, as long established in the art, has a standard outside diameter SD corresponding to a wall thickness T, and the threading of said pipe for a nut as used in lamp construction has standard threads which correspond to a pipe of said diameter SD. The standard threads have a root diameter and outside diameter which require considerable metal to be removed from a standard pipe to which they apply.

For example, a pipe which has a 1/8 inch nominal diameter, Briggs' Standard, which is practically the only standard in general use, has an actual outside diameter of .405 inch, and an actual inside diameter of .269 inch, with a wall thickness of .068 inch. A 3/8 inch nut is the standard nut used by the lamp trade on a 1/8 inch (nominal) diameter pipe. The standard outside diameter of electrical thread corresponding to such a nut is about .38 inch, requiring a thickness of metal to be removed from the pipe of about .013 inch. The root diameter of the thread is .334 inch, requiring a thickness of metal of about .035 inch to be removed for the root of the thread. A welded pipe can stand the action of a die in removing so much metal, but not where the pipe is split as for tube 10.

As a particular example, for a split pipe corresponding to a 1/8 inch standard pipe, we make the outside diameter of the pipe .38 inch instead of .405 inch, with a wall thickness of .063 inch. Using a standard 3/8 inch electrical thread requires practically no removal of metal for the outside diameter of the thread and only a thickness of .023 inch of metal to be removed for the root of the thread.

As just described, reduction in the amount of metal removed in threading is obtained by making the outside diameter D of the split pipe less than standard, while retaining the standard wall thickness of the pipe or nearly said thickness, and using a thread substantially standard for pipe of the standard outside diameter. This is the preferred and cheapest way. However, reduction in the amount of metal can also be obtained where the split pipe is made of standard outside diameter with thread upon it, standard for a substantially larger outside diameter. In fact the preferred way is but a special case of the latter way.

Instead of using a supporting tube for the lamp which is threaded at both ends, the usual way in lamps, we use a tube having a flange formed at its lower end. The flange 14 on tube 10 and flange 19 on tube 18 are formed by forcing the end of tube against a resisting surface, causing said end to spread out as in Figs. 4 and 7. From said surface, fitting inside said tube, not shown, for a few inches, is a mandrel. Outside the tube near said resisting surface a collar, not shown, is used over the tube to prevent its spreading as its end is flattened out against the resisting surface. This is especially necessary for split tube 10. The flange 14 is formed with less tearing of the metal in the case of tube 10 because of the split, the flange starting at the tube at the split and extending out and away on either side of the split giving rise to a recess shown at 20, with its apex at the split. With welded tube 18, flange 19 is badly torn when pressed out from the tube. The flanges 14 and 19 formed by spreading the end of the tube are cut into polygonal shape, substantially hexagonal as shown in Figs. 3 and 6. The polygonal shape of the flange makes it convenient to be gripped by a wrench in assembling the lamp.

There are a number of advantages in using a flanged tube instead of one requiring threading and a nut at each end, the nut at the lower end serving the same function as flanges 14 and 19. In a flanged tube, the junction of the flange and tube being rounded at 25, there is no sharp edge at the bottom of the tube to cut into the electric lighting wire at its point of entry, as is the case of a tube with its lower end threaded to receive a nut. There is no expense for threading and reaming the lower end of the tube, no lower nut required and no labor of putting the nut on. Without a nut on the lower end, there is one less chance for loosening up of the supporting tube during the life of the lamp.

We claim:—

1. A lamp comprising an inner length of tubing provided with an integral outstanding flange at its extreme lower end, the thickness of the flange being substantially the same as the wall of the tubing, the upper end of said tubing being threaded, a lamp base having an opening through which said tubing is inserted with said flange coming against the inside of the base at its opening, said flange being readily slidable over the inside of the base as the tubing is tightened into position, a sleeve over said tubing with its lower end resting on said base, said sleeve being of less length than the tubing whereby the upper end of the tubing extends above the sleeve and a nut screwed upon the upper end of the tubing bearing down upon the top of said sleeve, said flange having its periphery polygonal shaped, adapting it to be held by a wrench while said nut is screwed.

2. In a lamp construction having a base, an inner supporting tubing having an outstanding flange at its extreme lower end of substantially the same thickness as the wall of the tubing, and threaded for a substantial length at its other end, said flange coming within the base and presenting a surface to the base readily rotatably slidable therewith as the tubing is tightened in position in the lamp, said flange having its periphery polygonal shaped adapting it to be gripped by a wrench.

3. In a lamp construction, an inner supporting tubing having a split substantially parallel to its longitudinal axis, and an outstanding flange at one end of the tubing, said flange having a recess with its apex substantially at the wall of the tubing at the split and having its surfaces substantially flat and parallel throughout its extent.

4. In a lamp construction having a base and a sleeve resting upon the base; an inner tubing having an outstanding flange at its extreme lower edge, said tubing extending through said sleeve, with its upper end extending above the top of the sleeve, said flange coming within the base and being of a single thickness of metal integral at its inner edge with the tube, the junction of the tube and flange being rounded on the inside to prevent injury to insulation on wire inserted through the tubing, and fastening means engaging the portion of the tubing above the sleeve and the upper portion of the sleeve for holding the sleeve down upon the base.

5. In a lamp construction, an inner supporting tubing threaded at its upper end, having a split extending upwardly from its lower end and substantially parallel to its longitudinal axis, and an outstanding flange at its lower end extending substantially at right angles to said axis, said flange being a continuation of the wall of the tubing in a single layer, the inside of the tubing at its lower end being rounded where the wall of the tubing continues outward as the flange, a V-shaped recess being formed in the flange with its apex substantially at the wall of the tubing at the split.

ALFRED EMERSON JR.
STUART M. STRAUSS.